United States Patent [19]

Matsuo et al.

[11] Patent Number: 5,003,160

[45] Date of Patent: Mar. 26, 1991

[54] REFLOW FURNACE CONTROL SYSTEM

[75] Inventors: Shouichi Matsuo; Yasuo Kotou, both of Hirakata, Japan

[73] Assignee: Matsushita Electric Works, Ltd., Osaka, Japan

[21] Appl. No.: 203,777

[22] Filed: Jun. 2, 1988

[30] Foreign Application Priority Data

Jun. 19, 1987 [JP] Japan .......................... 62-153821

[51] Int. Cl.$^5$ ........................................... H05B 1/02
[52] U.S. Cl. ................................. 219/494; 219/506; 219/388; 219/483; 373/135; 373/136; 432/51; 364/801
[58] Field of Search ............... 219/388, 494, 483–486, 219/497, 492, 506; 364/477, 801; 432/51; 373/135, 136, 144; 340/588, 589

[56] References Cited

U.S. PATENT DOCUMENTS

| | | | |
|---|---|---|---|
| 4,565,917 | 1/1986 | Furtek | 219/388 |
| 4,603,730 | 8/1986 | Davis et al. | 373/136 |
| 4,605,161 | 8/1986 | Motomiya et al. | 219/388 |
| 4,610,886 | 9/1986 | Buller-Colthurst | 219/388 |
| 4,632,291 | 12/1986 | Rahn et al. | 219/388 |
| 4,698,774 | 10/1987 | Abe et al. | 219/388 |

*Primary Examiner*—M.H. Paschall
*Attorney, Agent, or Firm*—Armstrong, Nikaido, Marmelstein, Kubovcik & Murray

[57] ABSTRACT

A reflow furnace control system is contemplated to give an optimum time-temperature profile of an object intended to be heated. The object is carried on a conveyor to move along a conveyor path in the reflow furnace during which it is heated by heaters disposed along the conveyor path. A data table is provided to store sets of control data relating to the conveyor speed and the operating temperatures of the individual heaters. Each set of the control data is closely associated with various conditional parameters indicative of configuration and material characteristics of the object and the required temperature to which the object is heated. Control data assigning section is interfaced with the data table so that it responds to the entry of the conditional parameters for retrieving from the data table a relevant control data. Based upon the retrieved control data, the furnace is controlled by the system to give an optimum time-temperature profile of the object. Consequently, the system takes care of finding a relevant set of control data in response to the entry of the conditional parameters specific to an intended object, thus liberating the user from cumbersome operations of setting each control data, which would require considerable trial and error efforts.

3 Claims, 7 Drawing Sheets

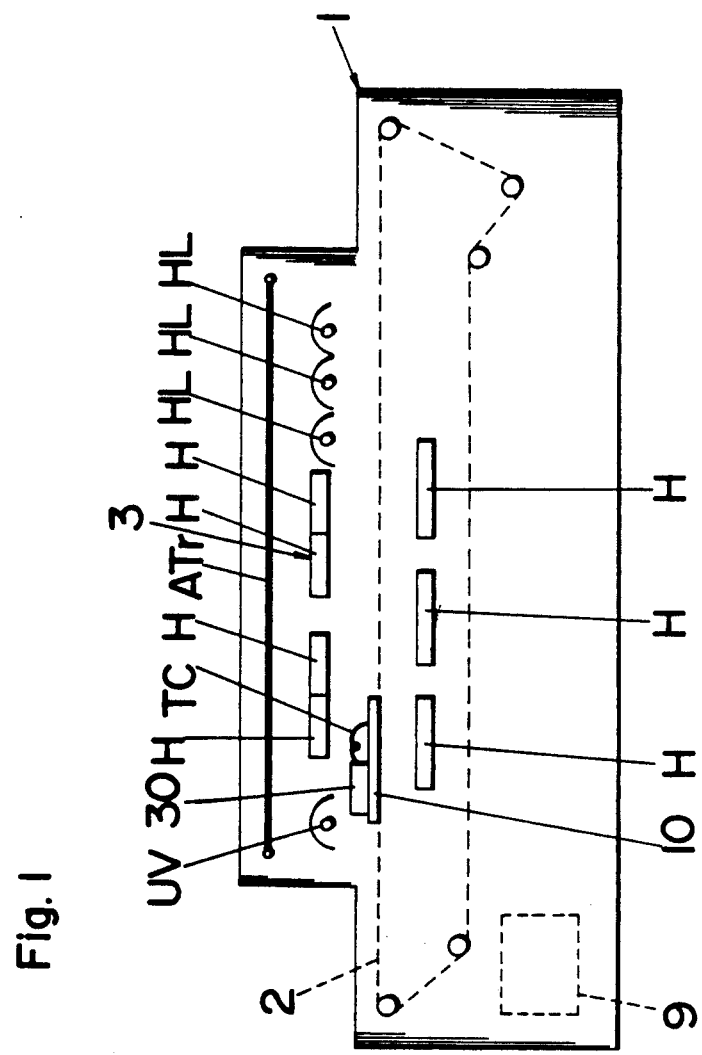
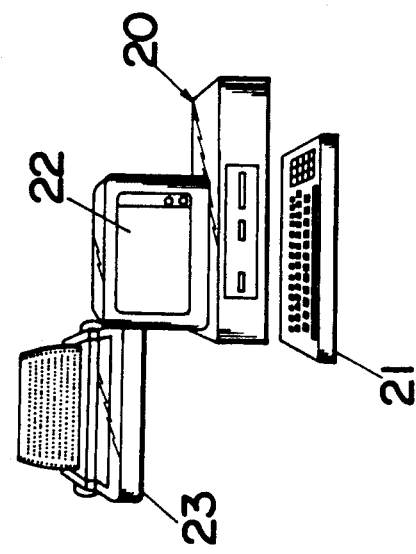
Fig. 1

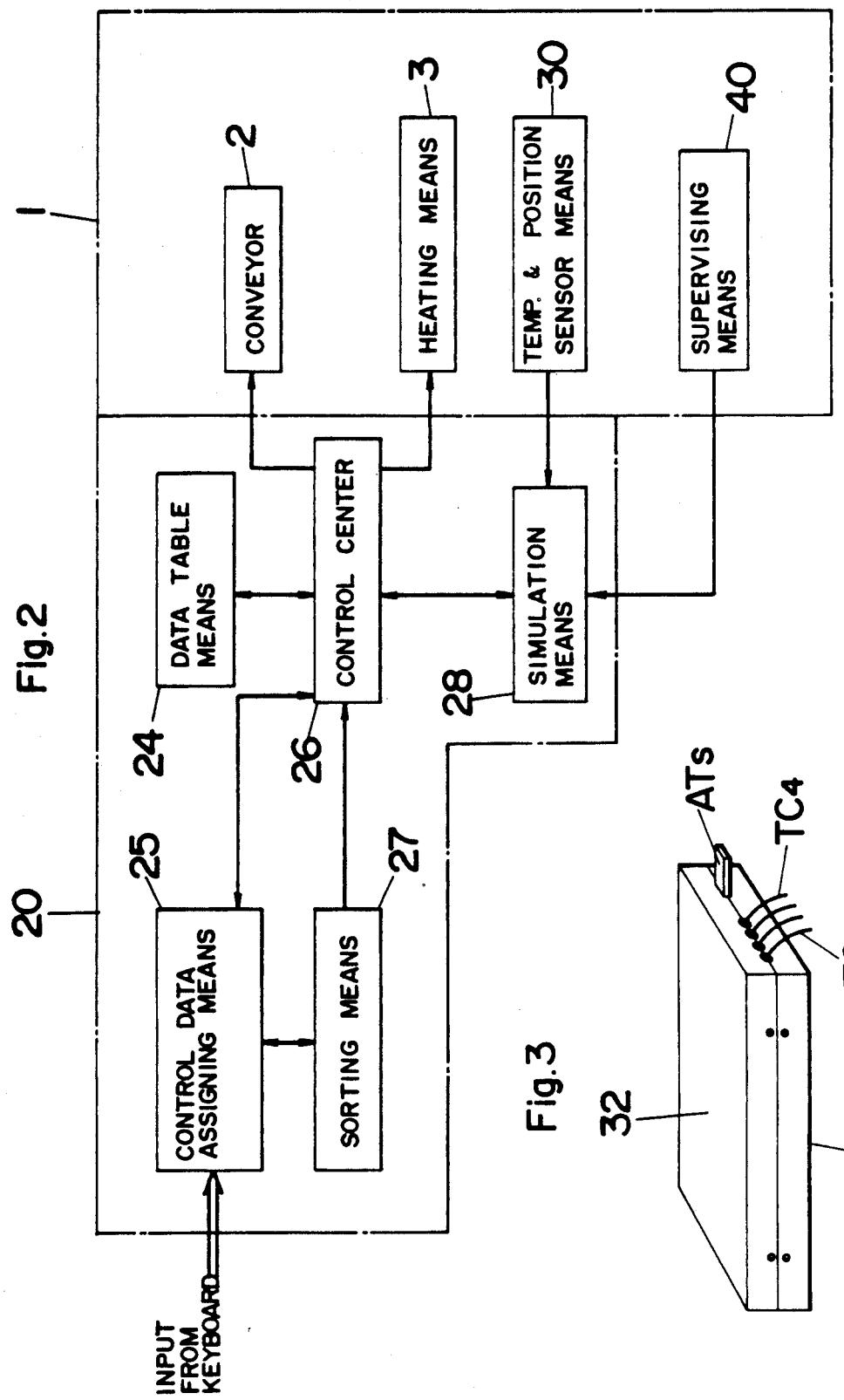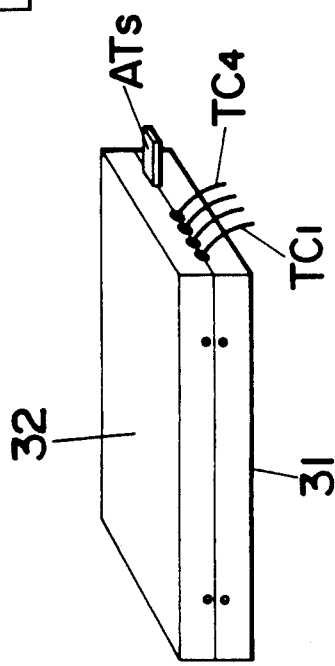

Fig.6

[DATA] HEAT CONDITION (LIST)

| PCB No. | PCB SPECIFICATION | | | | | | HEAT CONDITION | | | | | | | | |
|---|---|---|---|---|---|---|---|---|---|---|---|---|---|---|---|
| | T mm | L mm | W mm | D mm | M | S °C | SPEED m/min | UV | HEATER (°C) | | | | | HALOGEN(%) | | |
| | | | | | | | | | No.1 | No.2 | No.3 | No.4 | No.5 | No.1 | No.2 | No.3 |
| 1 | A | A | A | A | A | A | 1.4 | 1 | 160 | 160 | 170 | 170 | 200 | 75 | 75 | 75 |
| 2 | A | A | A | A | A | B | 1.0 | 0 | 100 | 100 | 100 | 100 | 100 | 100 | 100 | 100 |
| 3 | A | A | A | A | A | C | 1.4 | 0 | 405 | 223 | 355 | 243 | 415 | 50 | 50 | 50 |
| 4 | A | A | A | A | B | A | 1.0 | 0 | 400 | 240 | 400 | 310 | 410 | 50 | 50 | 50 |
| 5 | A | A | A | A | B | B | 1.0 | 1 | 400 | 240 | 400 | 310 | 400 | 50 | 50 | 50 |

REFLOW FURNACE CONTROL SYSTEM

BACKGROUND OF THE INVENTION

1. Field of the Invention

The present invention is directed to a reflow furnace control system, and more particularly, to a control system for mass soldering reflow furnace.

2. Description of the prior art

In conventional furnaces used for reflow soldering electrical components to a printed board, control has been made to effect heating in a manner to obtain a preferred time-temperature profile of the board and/or the individual components as the latter moves along a conveyor line within the furnace. Such control is directed to several variables such as the transporting speed of the object, the operating temperature of individual heating elements disposed along the conveyor line, and therefore requires a number of steps for setting individual variables prior to running the reflow furnace. Further, since these variables will differ critically with differing conditional parameters including configuration and material characteristics as well as a required heating temperature of an intended object, the variable setting should be made in due consideration of the conditional parameters specific to the object in order to obtain an optimum time-temperature profile of the object and therefore can only be determined empirically after making a number of test runs. Such trial and error technique is obviously time consuming and cumbersome, causing undesirable loss of material such as printed boards, solder, and components to be soldered on the board. In a practical sense, the control of the reflow furnace is substantially possible only by a highly experienced person and not by an unskilled person, which poses a severe problem in its industrial application.

SUMMARY OF THE INVENTION

The above problem are eliminated in a reflow furnace control system of the present invention which uses a data table containing sets of control data for controlling a reflow furnace in an optimum manner in response to various conditional parameters specific to an object to be treated. The object is carried on a conveyor to be transported along a conveyor line during which it is heated by a heating device disposed along the conveyor line. Each set of control data stored in the data table are related to the transporting speed of the conveyor and the operating temperature of the heating device, and are determined in close association with various conditional parameters specific to and indicative of the configuration and material characteristics of the object plus the required temperature to which the object is heated. A control data assigning device is provided which, in response to the entry of the conditional parameters of a given object, retrieves from the data table the control data most relevant to the object and consistent with the conditional parameters thereof. Based upon the retrieved control data, the system operates to control the conveyor speed and the operating temperatures of the heating device in order to give an optimum time-temperature profile of the object. That is, the assigning device cooperates with the data table to take care of cumbersome processes of obtaining an optimum control data with respect to the given conditional parameters of the object without requiring the cumbersome settings of the control data by the user. With this result, it is possible to control the furnace with a minimum setting requirement of only the conditional parameters known to the object and without requiring any other complicated control settings of the furnace, which facilitates the use of the furnace even by an unskilled person not knowing the exact interrelation between the control settings of the furnace and the conditional parameters of the object intended.

Accordingly, it is a primary object of the present invention to provide a reflow furnace control system which enables an easy control operation even by an unskilled person and without requiring a number of time and material consuming trial runs.

In a preferred embodiment, the control data assigning device is designed to allow the input of each conditional parameters selectively from preset values and kinds of material arranged in two or more ranks. Thus, the conditional parameter settings can be easily made with reference to the ranked values and kinds of material, which considerably simplifies the conditional parameter settings, which is therefore another object of the present invention.

A simulation device is also incorporated in the system to process the control data retrieved as corresponding to the given conditional parameters for providing a simulated time-temperature profile of the intended object. The profile is represented on a display for a confirmation purpose. With this simulation device, the user can be notified of the expected result prior to processing the object.

It is therefore a further object of the present invention to provide a reflow furnace control system which is capable of simulating the heating result, whereby finding any unexpected operation failures before entering actual processing.

Also included in the control system is a device for obtaining an actual time-temperature profile of the object by sensing temperatures reached by the object during its movement along the conveyor line and representing the resulting actual time-temperature profile on the display together with the simulated time-temperature profile in an overlaying relation to the simulated profile. With this provision, any substantial inconsistency between the two profiles can be found to be indicative of any serious defection of the system including the conveyor and the heating device, thus notifying the user to check and repair possible defections.

It is therefore a still further object of the present invention to provide a reflow furnace control system which is capable of checking the system by reference to the actual and simulated time-temperature profiles of the object.

The control data assigning device is further configured to allow the entry of the conditional parameters for more than one type of the objects and is associated with a sorting device which effects sorting of the processing order of the multiple types of the objects in ascending order of the required operating temperatures, so that the controlled heating can be performed in this order. This is particularly advantageous in economically managing energy for heating when different types of objects are to be sequentially processed.

It is therefore another object of the present invention to provide a reflow furnace control system which is capable of performing the controlled heating of plural types of objects in an effective and energy saving manner, improving overall efficiency.

These and still other objects and advantages will become more apparent from the following description of the embodiment of the present invention when taken in conjunction with the accompanying drawings.

BRIEF EXPLANATION OF THE DRAWINGS

FIG. 1 is a front view, in schematic representation, of a reflow furnace control system in accordance with a preferred embodiment of the present invention;

FIG. 2 is a block diagram illustrating the operations of the system;

FIG. 3 is a perspective view of sensor means including a data transmitter utilized in the system;

FIG. 6 shows an information appearing on a CRT monitor of the microcomputer;

DESCRIPTION OF THE PREFERRED EMBODIMENT

Figure 4:
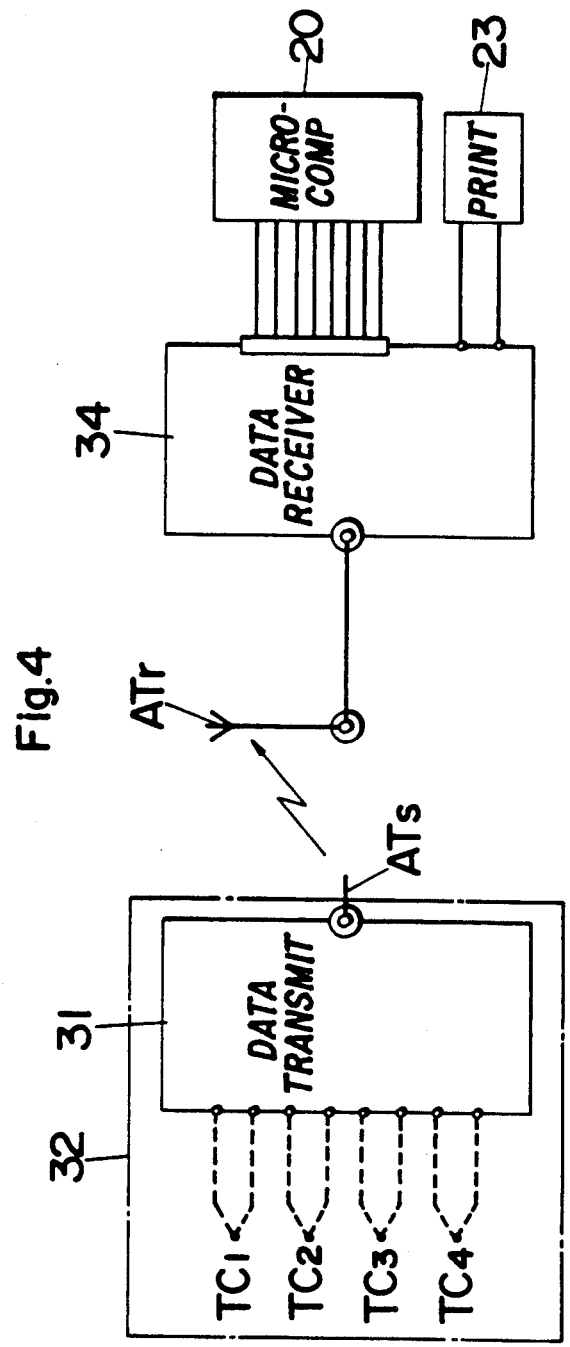
FIG. 4 is a schematic view illustrating the data transmitter and a complementary data receiver.

Referring now to FIG. 1, there is shown a reflow furnace control system in accordance with a preferred embodiment of the present invention. The system comprises a reflow furnace 1 and a remote control means 20 as provided in the form of a terminal microcomputer located away from the furnace 1 but electrically connected thereto. The furnace 1 is utilized mainly to effect reflow soldering of one or more of electronic components on a printed board by means of so-called creamy solder, which are hereinafter collectively referred to as an object and designated by a reference numeral 10.

Within the furnace 1 there is mounted a belt conveyor 2 driven by a motor (not shown) for carrying an object 10 which is subjected to reflow soldering while being carried along a straight conveyor path from the left to the right in the figure. Also included in the furnace 1 is heating means 3 including electric heaters H and halogen lamps HL arranged along the conveyor path. The electric heaters H cover the major portion of the conveyer path and are disposed in two rows above and below the conveyor path, while the halogen lamps HL are disposed in a row above the exit side of the conveyor path. A ultraviolet lamp UV is additionally mounted at the entrance side of the furnace 1 for promoting the curing of a ultraviolet curable resin which, in case of effecting the dip soldering, may be utilized to temporarily seize electronic components on the printed board prior to subjecting it to the dip soldering process. Thus, the ultraviolet lamp UV is only operative when the ultraviolet curable resin is utilized in the object 10.

The conveyor 1, heaters H, and lamps HL and UV are driven to operate by a controller provided at the furnace 1, which is in turn controllable through manual setting dials or knobs in a control section 9 provided on the side of the furnace (local control mode) or by the remote control means or microcomputer 20 (remote control mode) in order to obtain an optimum time-temperature profile of the object 10 for effect soldering as it is carried along the conveyor path. The selection between the local control mode and the remote control mode is made at a keyboard 21 attached to the remote control means or microcomputer 20 (hereinafter referred to simply as microcomputer 20). In addition, the microcomputer 20 is interfaced with a CRT monitor 22 and a printer 23 for presenting several informative data. The details of the remotely controlled operation will be discussed hereinafter.

The controller at the furnace 1 is driven based upon a set of control data which may be given directly by the user manipulating the control section 9 or by the instructions from the microcomputer 20 for properly operating the furnace 1. Such control data includes the transporting speed of the conveyor 2, the individual operating temperatures of the heaters H, the individual operating temperatures of or the voltage ratio (%) applied to the three halogen lamps HL, and the energization of the ultraviolet lamp UV, as seen in the right half of FIG. 6.

These control data are closely associated with conditional parameters specific to a given object 10 such as the configurations and material characteristics thereof and the solder used as well as the required temperature to which the object 10 is heated for soldering, and consequently differ critically from different types of objects intended. For easy control of the reflow furnace 1, that is for avoiding cumbersome trial and error efforts to find suitable control data from the conditional parameters of the object intended to be treated, data table means 24 is provided in the microcomputer 20 to store the correlation between the control data and the conditional parameters with regard to plural types of objects. That is, the table means 24 are provided to store the control data as associated with the corresponding conditional parameters for each of differing object 10 and is utilized effectively when the remote control mode is selected. The data table means 24 is realized by a data storing device attached to the microcomputer 20 and is accessible thereby to give exact or at least most approximate control data for the given object 10 in response to the input of the conditional parameters thereof. In practice, the data table means 24 is preconfigured to include plural sets of control data corresponding respectively to, for example, 243 types of the known objects and has free user areas for storing those corresponding to, for example, 257 types of new objects.

When the remote control mode is selected, the conditional parameters specific to an intended object 10 can be entered at the keyboard 21 and is then processed at the microcomputer 20, where it retrieves from the data table means 24, the control data most relevant to the designated conditional parameters, and controls the controller of the furnace 1 based upon the control data in such a manner as to provide an optimum time-temperature profile of the intended object 10. Within the microcomputer 20, as shown in FIG. 2, control data assigning means 25 receives the keyboard entry of the conditional parameters and interrogates a control center 26 to retrieve from the data table means 24 the relevant control data corresponding to the conditional parameters designated. The retrieved control data is displayed on the monitor 22 for confirmation by the user and the furnace 1 is controlled to operate based upon that control data.

In this remote control mode, the control data assigning means 25 is also capable of retrieving the desired control data from the data table means 24 by receiving keyboard entry of the product model identification of the intended object 10. To this end, the control data in the data table means 24 are indexed by the corresponding product model identifications. Thus, when an intended object 10 is known to be recorded in the data table means 24 by its product model name or number, the user is only required to input the identification rather than individual settings of the conditional parameters.

When the entry by the product model identification is not available and the entry is selected to be made by specific conditional parameters, the control data assigning 25 allows the input of each control parameter in an convenient manner with reference to preset values and kinds of material used arranged in three ranks for each of the conditional parameters.

As shown in the following Table 1, these conditional parameters include the thickness T (mm) of the printed board, surface area W×L (mm²) of the board, surface area D (mm²) of a maximum one of the components to be mounted on the board, material M of the board, melting point S (°C.) of the solder employed. The ranked values and kinds for each conditional parameters are designated by reference letters A, B, and C so that the user can simply input one of the letters for each conditional parameter as representative of the selected ranked values and kinds of material used for the printed board.

TABLE 1

| conditional parameters | ranked values and material | | |
|---|---|---|---|
| | A | B | C |
| Thickness of printed board T (mm) | 0.6–0.8 | 0.9–1.3 | 1.4–1.6 |
| Surface area of printed board W × L (mm²) | 2500 40000 | 40100– 90000 | 90100– 170200 |
| Surface area of a maximum component D (mm²) | none | 100– 256 | 259– 576 |
| Material of printed board M | epoxy resin in glassfiber substrate | aluminum | phenol resin in paper substrate |
| Melting point of solder S (°C.) | 160– 179 | 180– 185 | 186– 200 |

In this connection, the control data stored in the data table means 24 can be viewed on the monitor 22 in terms of respective letters A, B, and C indicating the ranked values and the material for each of the conditional parameters with the index of the production model identification, as seen in table 2 below.

TABLE 2

| production model identification no. | T | W × L | D | M | S |
|---|---|---|---|---|---|
| no. 1 | A | A | A | A | A |
| no. 2 | A | A | A | A | B |
| no. 3 | A | A | A | A | C |
| . | . | . | . | . | . |
| . | . | . | . | . | . |
| . | . | . | . | . | . |
| no. 242 | C | C | C | C | B |
| no. 243 | C | C | C | C | C |

In case that any of the conditional parameters is not covered in the above ranked values of Table 1, the control data assigning means 25 allows the user to directly modify any of the control data including:
(1) transporting speed of the conveyor 2;
(2) energization and deenergization of the ultraviolet lamp UV;
(3) individual operating temperatures of the respective heaters H; and
(4) individual voltages applied to the respective halogen lamps HL.

Such direct control data modification scheme can be made independently of or in combination with the ranked value input scheme. The latter combination scheme is found particularly advantageous when the intended object has the conditional parameters only few of which are not covered in the preset ranked values, while the other parameters fall well within the preset ranked values. For example, when the thickness T of the printed board has a value exceeding the ranked value as represented by reference letter C, while the other parameters has the respective values and kinds of board material within the ranked ones, it is convenient to firstly input the letter C as a tentative setting closest to the actual value along with the setting of the other parameters by the corresponding letters (A, B, C) so that the assigning means 25 can responds to provide the control data which is most approximate data reflecting a new object intended. Then, the user is required to modify the control data in order to obtain a desired time-temperature profile of the new object. With this manner, the modification of the control data can be made based upon the most approximate control data provided by the assigning means 25 in corporation with the control center 26 and the data table means 24, it is possible to greatly reduce the time in determining a new control data relevant for the newly intended object. The resulting new control data can be stored with an index of a new product model identification of the object in the free area of the data table means 24 so that it can be recalled by its index or the product model identification later. In this connection, the microcomputer 20 also allows to modify the preconfigured control data stored in the data table means 24 and update the modified control data while making the backup copy of the original data. This modification is made by the use of the keyboard 21.

For facilitating to determine a new set of desired control data with respect to a newly intended object 10, the reflow control system of the present invention includes sensor means 30 which detects the varying position and the temperatures reached by the object moving along the conveyor path and presents on the monitor 22 the actual time-temperature profile of the object 10 being processed or having ben processed for immediate visual reference by the user who is in an effort to determine the set of control data. Thus the obtained record of the time-temperature profile can be displayed on the monitor 22, printed by the printer 23, or even sent through a telecommunication method to an external device.

When it is selected to designate the conditional parameters by the product model identification, the assigning means 25 also provides a selective menu inquiring whether the process is for different types of the objects requiring different time temperature profiles or for a single type of the objects. When the differing types of the objects are intended and so selected on the menu, the user is required to input the number of the types intended and the individual product model identifications. Then, the assigning means 25 responds to compare, in corporation with the control center 26 and the data table means 24, the required time-temperature profiles of the individual types of objects in term of their heating power requirement to each other, to let sorting means 27 to effect sorting of the processing of the objects in an ascending order of the overall operating temperatures required for the furnace 1, and to display that order on the monitor 22 for confirmation of the processing schedule. The processing of the multiple types of the objects in this order can be made through the control center 26 after confirming the displayed information.

The above sensor means 30 comprises a set of thermocouples $TC_1$ to $TC_4$ detecting the temperatures at several points of the object 10 moving along the conveyor path. The output of the thermocouples $TC_1$ to $TC_4$ having a resolution of 1° C. over a temperature range of 0 to 300° C. are sampled every 0.2 seconds at a data transmitter 31 and is transmitted through a sending antenna ATs on the data transmitter 31. The components of the data transmitter 31 is enclosed together with the portions of the thermocouples $TC_1$ to $TC_4$ within a heat-insulative case 32 of which one wall is made of stainless steel lined with bakelite. The signal data from the data transmitter 31 was received by a data receiver 34 mounted adjacent the furnace 1 through a receiving antenna ATr which is disposed within the furnace 1 to extend along the conveyor path and supported by heat-resistive insulators (not shown). With this configuration of the receiving antenna ATr, it is allowed to use a weak radio signal causing no substantial interference with any environmental device, for example, one categorized as F2D type in a frequency band of 49.86 MHz and having an electric field intensity of less than 500 μV/m measured at a distance of 3 meters).

Figure 7:
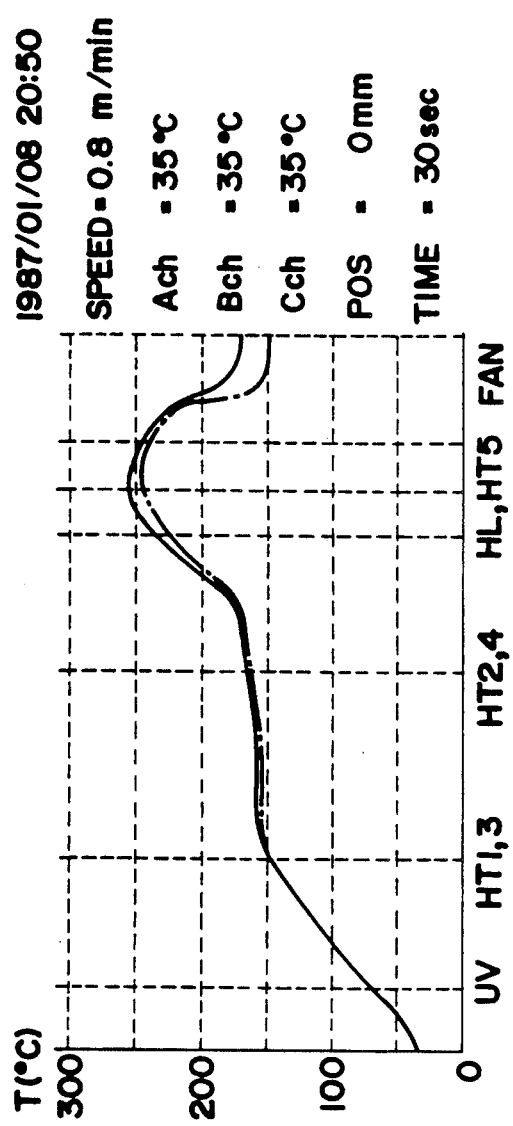
FIG. 7 shows another information selectively appearing on the same monitor.
Figure 8:
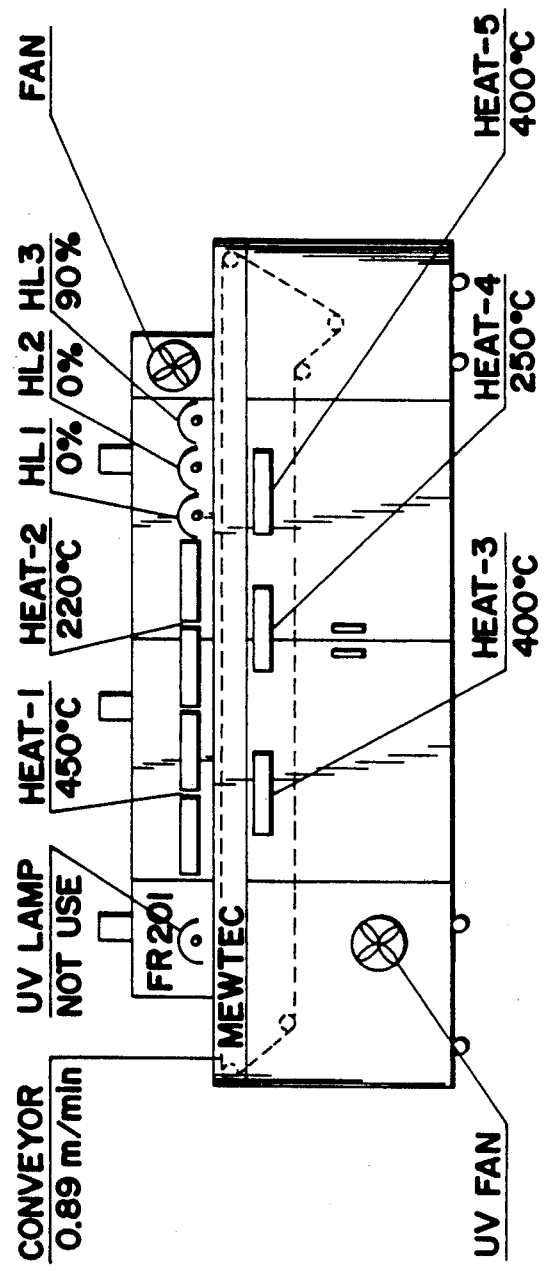
FIG. 8 shows further information selectively appearing on the same monitor.

The control system further includes a simulation means 28 which is operatively associated with the control center 26 of the microcomputer 20 to present on the CRT monitor 22, as shown in FIG. 7, a simulated time-temperature profile of the intended object by processing the control data retrieved in accordance with the setting of the conditional parameters given for the object, the profile being displayed together with other informative values or data. The simulation means 28 is also interactive with the sensor means 30 to process the actual temperature and position data of the object 1 so that it can optionally present on the same monitor 22 an actual time-temperature profile of the object being processed or having been processed in an overlaying relation with the simulated profile, also as seen in FIG. 7. Preferably, the simulated and actual profiles are displayed in different colors for an easy comparison purpose. When there is seen substantial coincidence between the simulated and actual profiles on the monitor 22, it is confirmed that the system operates properly. On the other hand, any inconsistency between the two profiles will be well indicative of that there is certain system control failure or defection in the heating means, warning the user to check the system. When the inconsistency of the two profiles is seen and there is no system failure nor defection is recognized, such a difference will be understood by the user to indicate an incorrect setting of the conditional parameters, whereby the user can readily attend to correcting the settings with reference to the displayed information.

The monitor 22 is designed to selectively display the time-temperature profiles of FIG. 7, to display the particulars of the control data of FIG. 6 retrieved for the intended object, and to display the picture of the furnace in operation together with the individual control data in association with the individual elements of the furnace. Such a selection is made by a mode selection input in a manner similar to the selection between the remote control mode and the local remote control mode.

Additionally, the control system includes a supervision means 40 which constantly monitors the operating conditions of the furnace 1 and issue alarm information on the monitor 22 once there is detected any failure or unusual operating conditions in the furnace, for example, overload of the conveyor 2, overload of a cooling fan for the ultraviolet lamp UV, over-heat or over-cool of the heaters H, overheat of the halogen lamps HL, and actuation of an emergency stop button of the furnace 1.

Figure 5:
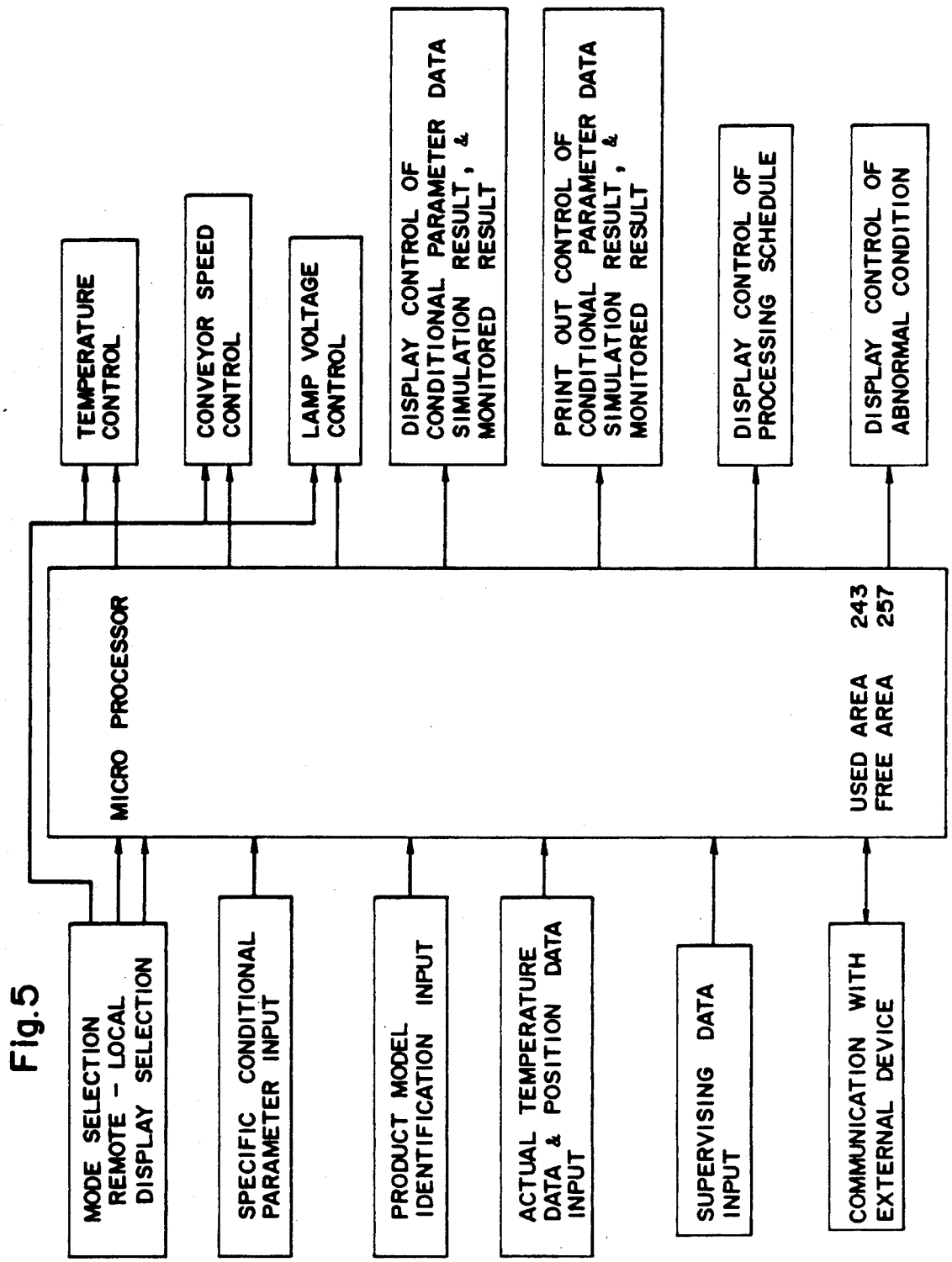
FIG. 5 is a block diagram illustrating the operations of control means or microcomputer utilized in the system.

FIG. 5 is provided for illustration in another way of the system operation in which a microprocessor is shown to be responsible for the operations of the control data assigning means 25, control center 26, sorting means 27, and simulation means 28 of the microcomputer 20.

What is claimed is:

1. A reflow furnace control system comprising:
   a conveyor in a reflow furnace for transporting an object to be heated along a conveyor line within said furnace;
   heating means, disposed along said conveyor line, for applying heat to said object on said conveyor;
   data table means containing sets of control data relating to a transporting speed of said conveyor and an operating temperature of said heating means, each set of control data being associated with various conditional parameters specific to and indicative of a configuration and material characteristics of a known type of object as well as a required temperature to which the object is heated;
   data entry means for entry of data;
   control data assigning means which, in response to an entry of the conditional parameters, retrieves from said data table means the control data relevant to said conditional parameters designated;
   control means for controlling the transporting speed of said conveyor and the operating temperature of said heating means based upon said retrieved control data in such a manner as to give an optimum time-temperature profile of the object during movement of the object along said conveyor line;
   simulation means which processes said retrieved control data in response to the designated conditional parameters for providing a simulated time-temperature profile of the object to be heated;
   display means for representing a resulting simulated time-temperature profile; and
   means for obtaining an actual time-temperature profile of an object by sensing temperatures reached by the object during movement of the object along said conveyor path and for representing a resulting actual time-temperature profile on said display means in an overlaying relation to said simulated time-temperature profile.

2. A reflow furnace control system as set forth in claim 1, wherein said control data assigning means allows input of each conditional parameter selectively from preset values arranged in at least two preset sets of values.

3. A reflow furnace control system as set forth in claim 1, wherein said control data assigning means allows the entry of the conditional parameters for more than one type of objects requiring different sets of control data, and including a sorting means for instructing said control means to sequentially perform controlled heating for the more than one type of objects in ascending order of operating temperature.

* * * * *